(12) United States Patent
Straza

(10) Patent No.: US 7,753,254 B2
(45) Date of Patent: *Jul. 13, 2010

(54) FORMED CORE SANDWICH STRUCTURE AND METHOD AND SYSTEM FOR MAKING SAME

(75) Inventor: George C. P. Straza, Imperial Beach, CA (US)

(73) Assignee: Celltech Metals, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,466

(22) Filed: Jul. 25, 2008

(65) Prior Publication Data

US 2008/0292898 A1 Nov. 27, 2008

Related U.S. Application Data

(63) Continuation of application No. 11/702,884, filed on Feb. 5, 2007, which is a continuation-in-part of application No. 11/285,096, filed on Nov. 22, 2005.

(51) Int. Cl.
*B23K 20/00* (2006.01)

(52) U.S. Cl. ...................... 228/193; 428/593

(58) Field of Classification Search ................. 228/193; 428/184, 593
See application file for complete search history.

(56) References Cited

U.S. PATENT DOCUMENTS

| | | | |
|---|---|---|---|
| 3,068,565 A * | 12/1962 | King et al. | ................... 228/181 |
| 3,071,853 A | 1/1963 | Price et al. | |
| 3,525,663 A | 8/1970 | Hale | |
| 4,035,536 A | 7/1977 | Morrison | |
| 4,374,886 A | 2/1983 | Raghava | |
| 4,530,197 A | 7/1985 | Rainville | |
| 4,676,843 A | 6/1987 | Nazmy | |
| 4,759,994 A | 7/1988 | Lesourd | |
| 5,316,863 A | 5/1994 | Johnson et al. | |
| 6,138,898 A | 10/2000 | Will et al. | |

(Continued)

FOREIGN PATENT DOCUMENTS

| | | |
|---|---|---|
| DE | 19729566 | 1/1999 |
| DE | 4430428 | 12/2005 |
| JP | 11047980 | 2/1999 |

OTHER PUBLICATIONS

Brazetec, "The Principles of Brazing for Pipe Installation" (2001) pp. 1-27 (www.BrazeTec.com).

(Continued)

*Primary Examiner*—Jessica L Ward
*Assistant Examiner*—Nicholas P D'Aniello
(74) *Attorney, Agent, or Firm*—Paul Davis; Goodwin Procter LLP

(57) ABSTRACT

A method and apparatus for producing a sandwich structure that is lightweight and many times stiffer than regular sheet metal, and which is easily formable into curved structures as well as structures having compound curves. In one embodiment, a formed core includes a plurality of cells comprising alternating front and rear projections extending outwardly in front of and behind a median plane, with each projection having a bonding surface area or land configured to be bonded with corresponding external sheets on both sides of the formed core. A plurality of micro-abrasions or indentations are formed on the bonding lands, allowing stronger bonding joints to be formed between the core and the external sheets by facilitating improved capillary action by the core during the bonding process.

31 Claims, 10 Drawing Sheets

U.S. PATENT DOCUMENTS

| | | | |
|---|---|---|---|
| 6,221,463 B1 * | 4/2001 | White | 428/174 |
| 6,419,146 B1 | 7/2002 | Buldhaupt et al. | |
| 6,544,623 B1 | 4/2003 | Straza | |
| 6,689,328 B1 | 2/2004 | Otani et al. | |
| 2004/0154252 A1 | 8/2004 | Sypeck et al. | |
| 2007/0243408 A1 | 10/2007 | Straza | |

OTHER PUBLICATIONS

"Brazing of Non-Ferrous Metals" at http://www.key-to-metals.com/Article36.htm, visited Oct. 18, 2005.

DOI, The Japan Automotive Digest (2007) p. 7.

Encylopedia of brazing and soldering—C—http://www.brazetec.com/brazetec/content_en/lexicon/c.cfm, visited Oct. 18, 2005.

Feldbauer, "Modern Brazing of Stainless Steel" in Welding Journal, http://www.aws.org/wj/2004/10/030/, visited Oct. 18, 2005.

International Search Report and Written Opinion for PCT/US06/45102, mailed May 22, 2007, 5 pages.

Mohandas et al., Journal of Materials Science Letters (1999) 18:167.

Mohr and Straza, Advanced Engineering Materials (2005) 7(4):243-246.

* cited by examiner

FORMED CORE SANDWICH STRUCTURE AND METHOD AND SYSTEM FOR MAKING SAME

CROSS-REFERENCE TO RELATED APPLICATIONS

This application is a continuation of U.S. patent application Ser. No. 11/702,884, filed as a continuation-in-part on Feb. 2, 2007, which claims priority to U.S. patent application Ser. No. 11/285,096, filed on Nov. 22, 2005, the contents of which are incorporated by reference herein in their entirety.

BACKGROUND OF THE INVENTION

1. Technical Field

The present invention relates to metal sandwich sheet structures and, more particularly, to formable metal core sandwich sheet structures and methods and systems for manufacturing same.

2. Description of Related Art

Metal core sandwich structures are known in the art. For example, U.S. Pat. No. 3,525,663 to Hale and U.S. Pat. No. 4,035,536 to Morrison both disclose metal sandwich structures having a formed metal core brazed to two outer metal sheets. However, it is believed that the structures disclosed by Hale and Morrison, and other similar conventional formed metal core sandwich structures, cannot be easily formed into compound curves and other complex shapes without delaminating, wrinkling and/or otherwise losing its structural integrity. Therefore, prior metal core sandwich structures are not well-suited for applications that require formation of compound curves, for example, without delaminating or wrinkling during the forming process.

Other types of metal core sandwich structures, such as honeycomb sandwich structures, are described in U.S. Pat. No. 6,544,623 to Straza, for example. Although this honeycomb core sandwich structure provides improved formability when compared to other metal core sandwich structures, it is relatively expensive to manufacture and, therefore, not well-suited for many commercial, cost-sensitive applications (e.g., automobile bodies).

Therefore, there is a need for an improved metal core sandwich structure that is more economical to manufacture and which exhibits improved formability characteristics without sacrificing structural integrity and strength.

BRIEF SUMMARY OF THE INVENTION

The invention addresses the above and other needs by providing an improved metal sandwich sheet structure that includes a formed metal core that is brazed or bonded to two outer flat metal sheets. This improved metal sandwich structure is capable of being formed into complex shapes while retaining its structural integrity. This improved metal sandwich structure is also easier and more economical to manufacture than prior honeycomb core sandwich structures, while providing similar strengths and characteristics as the honeycomb core structures.

In one embodiment of the invention, a method of producing a metal core sandwich structure includes providing a formed metal core that is lightweight and many times stiffer than regular sheet metal, and which is easily formable into curved structures as well as structures having compound curves that curve in two or more directions simultaneously, for example. In one embodiment, a metal core sheet is rolled, stamped or pressed into a corrugated shape having a plurality of cells comprising alternating front and rear projections extending outwardly in front of and behind a median plane, with each projection having a bonding surface area or land configured to be brazed or bonded with corresponding external metal sheets on both sides of the formed metal core sheet. A plurality of micro-abrasions or indentations are formed on the bonding lands, allowing stronger brazing joints to be formed between the metal core and the external metal sheets by facilitating improved capillary action by the metal core during the brazing process. The improved brazing joints provide better bonds so the resulting multi-layer sheet structure will not fracture or delaminate during forming. The resulting sandwich structure is easier to form into complex curves and shapes while maintaining its structural integrity. Thus, the improved metal sandwich structure is well suited for various applications where formability and structural integrity are important (e.g., automotive body applications).

In another embodiment of the invention, an apparatus for forming an improved core metal sheet is provided. The apparatus includes a press or mold that presses (via stretching and/or gathering) the core metal sheet to form a desired corrugated core structure. At desired locations on the surface of the press, micro-protrusions and/or micro-ridges and/or micro-lines (collectively referred to herein as "micro-protrusions") extend outwardly from the press surfaces so that during forming of the core metal sheet, micro-abrasions and/or micro-grooves and/or micro-channels (collectively referred to herein as "micro-abrasions") are formed to extend inwardly on desired surface areas of the formed metal core. These micro-abrasions allow for improved brazing between the formed metal core and the two outer metal sheets through improved capillary action by the metal core during brazing. Although brazing is one exemplary method of bonding described herein, those of skill in the art will recognize that brazing is only one type of bonding that may be used within the context of the present invention. Other well-known techniques for bonding two structures together include various types of welding, soldering, adhering (e.g., permanent adhesives or glue), etc. Various types of bonding known in the art may be utilized in accordance with various embodiments of the present invention.

In a further embodiment, the outer layer sheets are electro-tacked to the formed core prior to brazing or bonding, which allows for improved subsequent brazing and an improved quality sandwich structure. In one embodiment, the invention provides a novel electro-tacking apparatus for tack welding the formed core to the outer metal sheets prior to brazing.

In various embodiments of the invention, various cell shapes and geometries such as hexagonal, square, octagonal or other shape may be formed in the core sheet as well as different cell sizes in accordance with desired formability, stiffness and crush characteristics. For example, it may be desirable for some zones of the sandwich structure to be more easily crushed (e.g., to provide "crush zones" in an automobile body frame) or to be more rigid or more flexible. For example, if crush zones are desired, the sandwich structure (or at least designated areas of the sandwich structure) can be designed to be more easily crushed which may help avoid automobile impact injuries while other areas of the automobile body (e.g., roofs) will be stiffer, allowing for more protection from metal crushing into passenger compartments.

DETAILED DESCRIPTION OF THE EXEMPLARY EMBODIMENTS OF THE INVENTION

Exemplary embodiments of the invention are described in detail below with reference to the figures wherein like elements are referenced with like numerals throughout. It is understood that the figures are not necessarily drawn to scale but intended to merely illustrate some of the novel aspects, features and processes of the invention.

Figure 1:
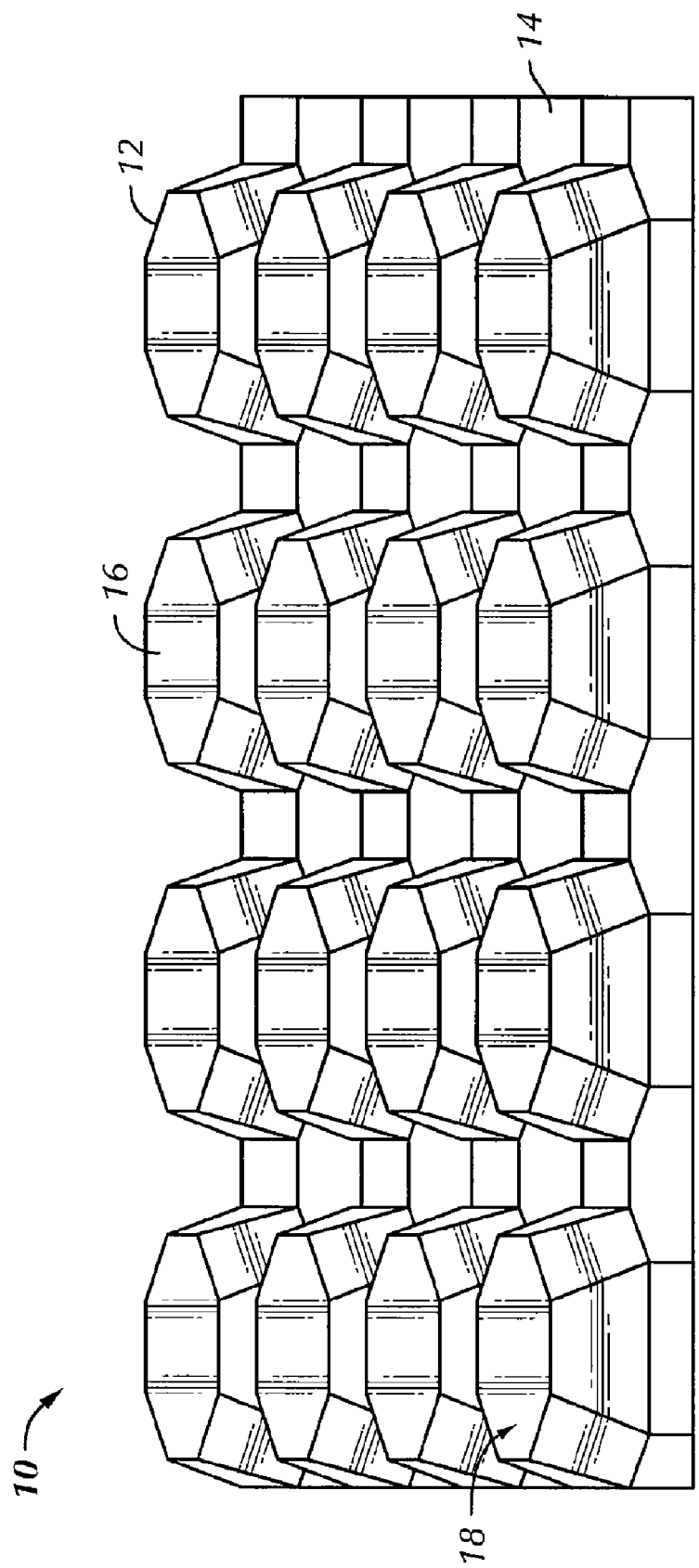
FIG. 1 illustrates a perspective view of a metal core sheet after it has been formed, in accordance with one embodiment of the invention.

FIG. 1 illustrates a perspective view of a formed metal core 10 made in accordance with one embodiment of the invention. In this embodiment, the metal core 10 is formed in a corrugated pattern having a plurality of cells 12 comprising alternating front and rear projections extending outwardly in front of and behind a median plane 14, with each projection having a bonding surface area or land 16 configured to be brazed or bonded with corresponding external metal sheets (not shown) on both sides of the median plane 14. As shown in FIG. 1, a plurality of micro-abrasions or indentations 18 are formed on the bonding lands 16. As explained in further detail below, the micro-abrasions 18 provide stronger brazing joints to be formed between the metal core 10 and the external metal sheets by facilitating improved capillary action by the metal core 10 during the brazing process.

Figure 2A:
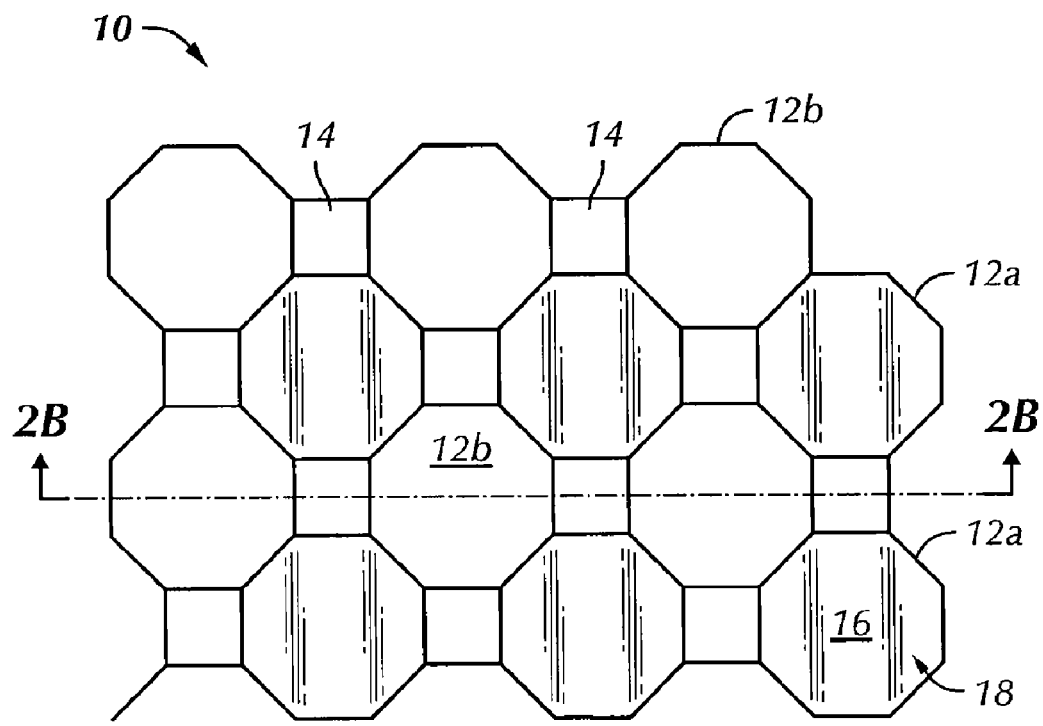
FIG. 2A illustrates a top view of the formed metal core sheet of FIG. 1.

FIG. 2A illustrates a top view of the formed metal core 10 of FIG. 1. The metal core 10 includes a plurality of upwardly projecting cells 12A and a plurality of downwardly projecting cells 12B. The bonding lands 16 of the upwardly projecting cells 12A are also shown while the bonding lands 16 of the downwardly projecting cells 12B are located on the opposite side of the core 10 and, hence, not shown in FIG. 2A. A plurality of micro-abrasions or indentions 18 are formed on the bonding lands 16 of each cell 12A and 12B to facilitate improved capillary action of the metal core 10 during brazing.

Figure 2B:
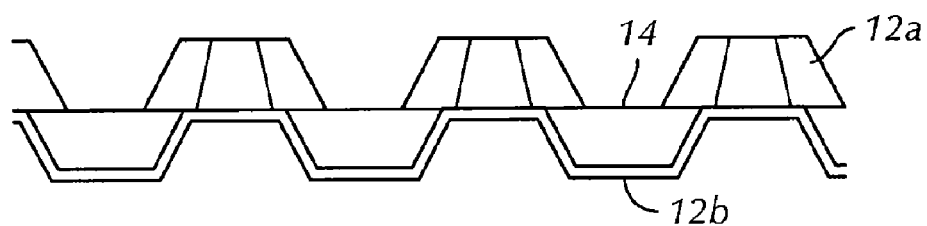
FIG. 2B illustrates a cross-sectional side view of the formed metal sheet of FIGS. 1 and 2A, taken along a cross-section indicated by lines 2B-2B of FIG. 2A.

FIG. 2B illustrates a cross-sectional side view of the metal core 10 taken along perspective lines 2B-2B of FIG. 2A. As shown in FIGS. 1, 2A and 2B, in one embodiment, each cell 12A and 12B is formed in the shape of an octagon. However, it is understood that the invention is not limited to any particular shape, size and/or configuration of the cells 12A, 12B. Any desired shape, size and configuration of cells may be utilized to achieve various desired physical characteristics of the resulting metal core sandwich structure, in accordance with the present invention.

Figure 3A:
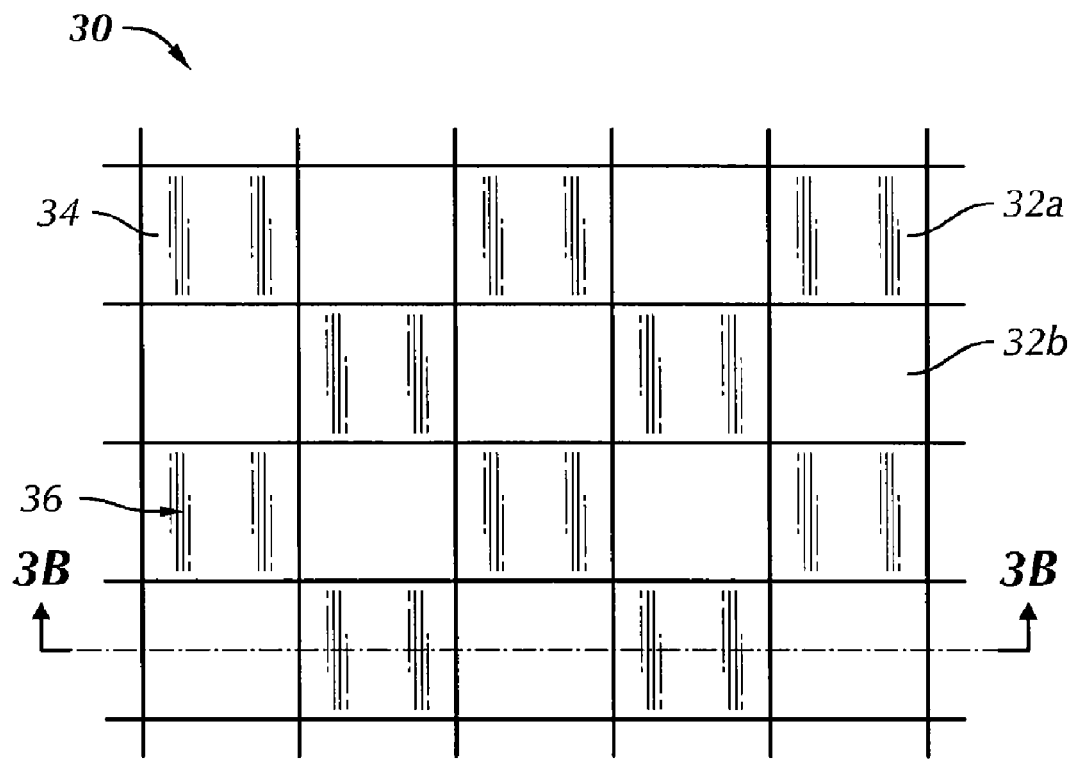
FIG. 3A illustrates a top view of a metal core sheet formed in a corrugated checker-board pattern, in accordance with another embodiment of the invention.
Figure 3B:
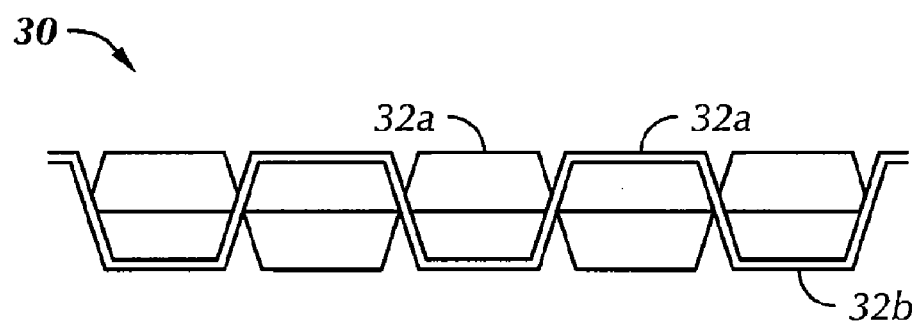
FIG. 3B illustrates a cross-section side view of the formed metal core of FIG. 3A taken along lines 3B-3B of FIG. 3A.

FIG. 3A illustrates a top view of an alternative, exemplary formed metal core 30 having a plurality of square-shaped cells 32A and 32B in a checkerboard configuration. The cells 32A represent upwardly projecting cells and the cells 32B represent downwardly projecting cells. Each cell 32A and 32B has a corresponding bonding land 34 and a plurality of micro-abrasions 36 on the surface of each bonding land 34. FIG. 3B illustrates a cross-sectional side view of the formed metal core 30 of FIG. 3A, taken along lines 3B-3B of that figure.

Figure 4:
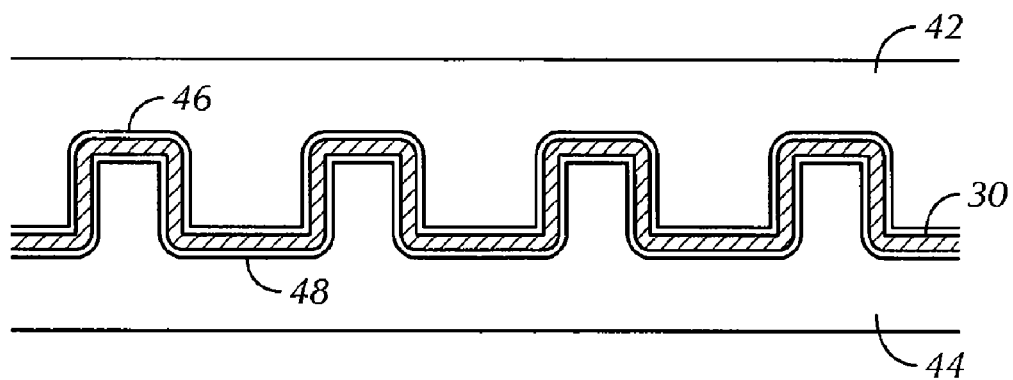
FIG. 4 illustrates a side view of a metal core sheet being formed between two press plates or molds, in accordance with one embodiment of the invention.

FIG. 4 illustrates a cross-sectional side view of the metal core 30 as it is formed between two presses 42 and 44 having corresponding molded patterns and configurations to form the metal core 30 into a desired shape and configuration. During forming, a flat sheet of metal material 30 is placed between the top and bottom presses 42 and 44, respectively. As the top and bottom presses 42 and 44 are pressed together the metal core 30 is formed via stretching and/or gathering of the metal sheet material 30 to form the cells 32A and 32B in a checkerboard configuration. It is understood that the presses 42 and 44 are exemplary only and that presses having other desired molded patterns and configurations may be utilized to form a metal core having cells of various shapes (e.g., octagons, hexagons, pentagons, squares, triangles, etc.), and sizes, and configurations.

In one embodiment, the micro-abrasions 36 illustrated in FIG. 3A, for example, are formed during pressing of the metal core 30. A plurality of micro-protrusions, ridges and/or lines (collectively referred to herein as "micro-protrusions") (not shown) are provided on selected surfaces 46 and 48 of top and bottom presses 42 and 44, respectively. During pressing of the metal core 30, the micro-protrusions form the plurality of micro-abrasions 36 on the bonding lands 34 of the cells 32A, 32B of the formed metal core 30. In one embodiment, the micro-protrusions are formed on the surfaces of the presses 42 and 44 corresponding to the bonding lands 34 of the formed metal core 30. In one embodiment, the micro-protrusions are formed on the corresponding press surfaces by fine etching of press surfaces using known means and techniques (e.g., electrical metal etching, chemical etching, sand blasting, grit blasting, etc.). In one embodiment, the micro-protrusions are formed so as to provide micro-abrasions 36 having a depth and/or width of 0.0005 inches to 0.002 inches and cover approximately 50-80% of the surface area of the bonding lands 34. In various embodiments, the abrasions 36 may be substantially parallel channels, criss-cross configurations, or channels traveling in random directions and/or curved channels. In alternative embodiments, the micro-abrasions may be formed by electronic discharge machining (EDM) processes, which are well-known in the art. In other embodiments, the micro-abrasions 36 may be formed on the bonding lands 34 of the metal core 30 after the metal core 30 has been pressed and formed. It is appreciated, however, that providing presses 42 and 44 with preformed micro-protrusions that automatically form micro-abrasions 36 on the metal core 30 during pressing can save substantial time and work when compared to forming the micro-abrasions 36 manually or individually for each metal core 30 subsequent to pressing.

In alternative embodiments, the metal core 10, 30 may be formed after a brazing material has been placed on each side of the core 10, 30. Thus, the metal core sheet, plus brazing material on each side of the metal core sheets, are pressed and formed together by the presses 42 and 44. The brazing material can be placed onto the surface of the metal core 10, 30 prior to forming the core 10, 30 by spraying a brazing powder onto the core sheet to be formed or by placing sheets of brazing material 50 on either side of the core sheet to be formed. With the proper amount of pressure during forming, the brazing material will be embedded into the core sheet. This facilitates the subsequent brazing process by evenly distributing the braze material across the surface of the core sheet to be formed. In these embodiments, the micro-abrasions 18, 36 are formed and pass through the brazing material onto the bonding lands 16, 34 of the formed metal core 10, 30. Thereafter, the formed metal core 10, 30 plus formed brazing material sheets are sandwiched between two external metal sheets and brazed at high temperature (e.g., 670 to 730 degrees Celsius) in a reduced-atmosphere or vacuum furnace to produce a metal core sandwich structure in accordance with the present invention.

Figure 5:
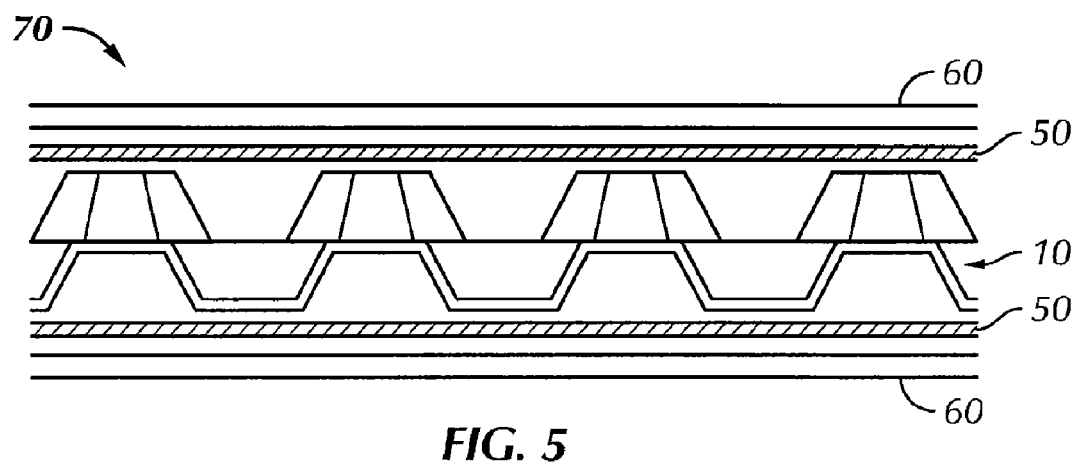
FIG. 5 illustrates an exploded side view of a metal core sandwich structure prior to brazing, in accordance with one embodiment of the invention.
Figure 6:
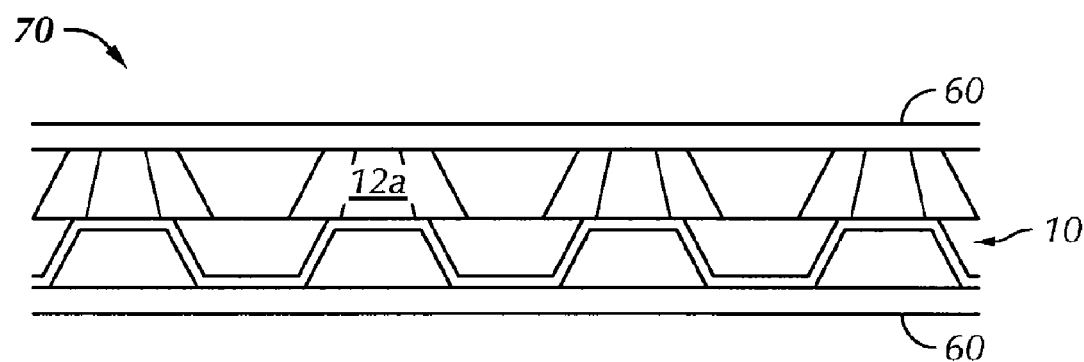
FIG. 6 illustrates the metal core sandwich structure of FIG. 4 after brazing.

FIG. 5 illustrates an exploded cross-sectional side view of an exemplary formed metal core 10 (FIG. 1) sandwiched between two sheets of brazing material 50, which are in turn sandwiched between two external metal sheets 60. In this embodiment, the brazing material sheets 50 have not been pressed and formed with the metal core 10, as described above. FIG. 6 illustrates a cross-section side view of the resulting metal core sandwich structure 70 after brazing of the metal core 10 to the external metal sheets 60 has been completed. The micro-abrasions 18 (FIG. 2A) allow for an improved capillary effect so that the brazing material 50, upon melting, flows into the pores of the bonding lands 16 (FIGS. 1 and 2A) more easily and thereby provides a stronger braze joint between the closely fitted surfaces of the bonding lands 16 and the external metal sheets 60. The improved capillary effect and, hence, improved brazing joint provided by the micro-abrasions 18 produce a stronger metal core sandwich structure 70 that can be formed into compound curves, and other shapes and forms, more easily without delaminating, wrinkling or otherwise losing its structural integrity. In further embodiments, micro-abrasions may also be formed on the interior surface of the external metal sheets 60 in order to improve the capillary effect of the external metal sheets 60 during brazing.

In a further embodiment of the invention, prior to brazing, all of the layers of the metal sandwich structure 70, comprising a formed metal core 10, brazing material sheets 50 and two outer metal sheets 60, are electro-tack-welded together so as to secure the multiple layers to one another and prevent relative movements during the brazing process. This further improves the strength of the braze joints formed between the bonding lands 16 of the core 10 and the external metal sheets 60 to provide a higher quality finished product.

Figure 7:
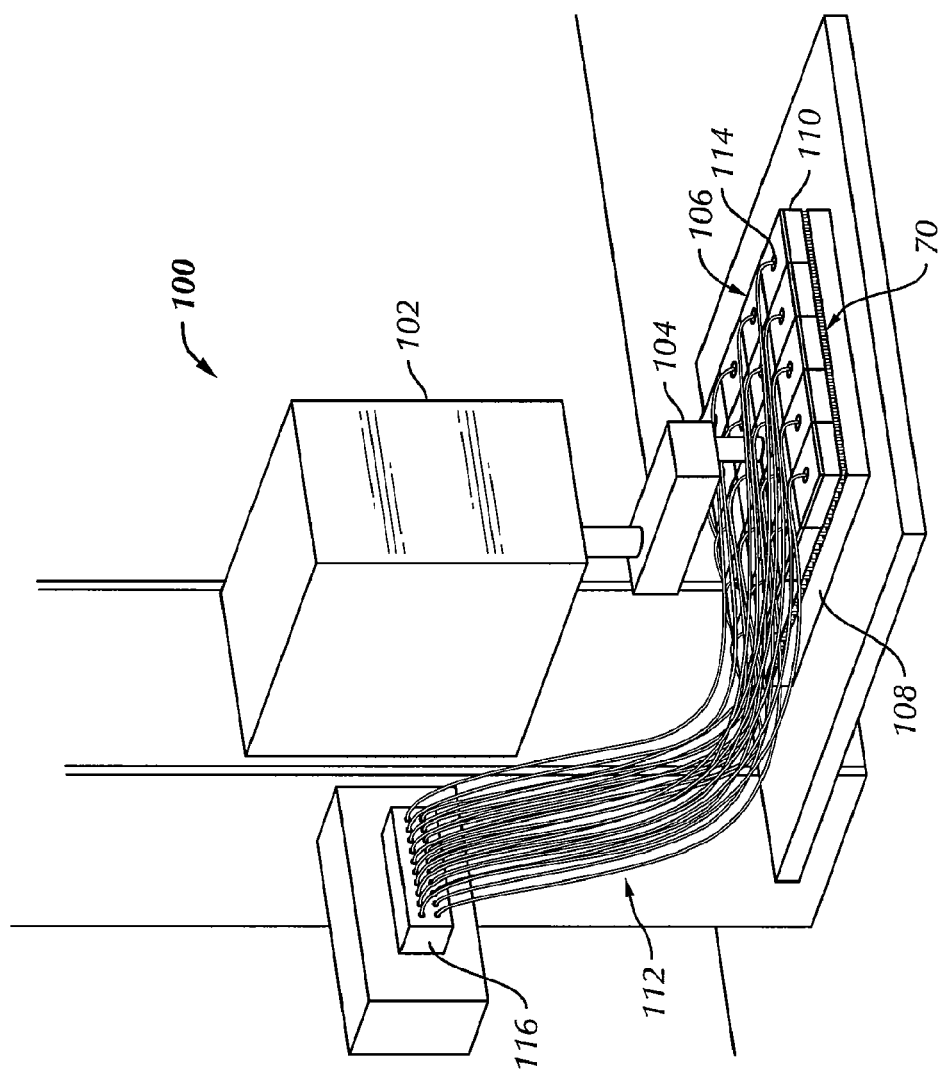
FIG. 7 illustrates a perspective view of an electro-tack welding apparatus used to tack weld the metal core sandwich structure prior to brazing, in accordance with a further embodiment of the invention.

FIG. 7 illustrates a perspective view of a novel tack welding apparatus 100 that may be used in conjunction with the present invention. The apparatus 100 includes a computer and/or electronically controlled actuator box 102 that contains standard electronics and mechanical components (e.g., gears, switches, power supply, etc.) to control movement of an actuator arm 104 that controls movement of a top plate 106. The metal core sandwich structure 70 (FIGS. 5 and 6) is positioned between the top plate 106 and a bottom ground plate 108. As shown in FIG. 7, the top tack-welding plate 106 comprises a plurality of subsections 110 that are electrically insulated from each other. In one embodiment, the subsections 110 can be made from copper or copper-alloy and are insulated from one another by an insulating material (e.g., ceramic). Each of the subsections 110 are electrically coupled to a corresponding conductive wire 112 via corresponding contacts 114. The conductive wires 112 are coupled to a power switch box 116 that controls when electrical current is supplied to each individual wire 112. The power switch box 116 can be controlled by a computer or processor (not shown).

In one embodiment, a high energy, low voltage current is sequentially applied to each subsection 110 to tack-weld a corresponding portion of the metal core sandwich structure 70 located between the corresponding subsection 110 and the bottom ground plate 108. In one embodiment, the top and bottom plates 106 and 108, respectively, apply an even pressure throughout the sandwich structure 70. A sequence of tack welds are rapidly performed in different areas of the sandwich structure 70 by sequentially applying an electrical current to each subsection 110 of the top plate 106. By sequentially tack-welding only portions of the sandwich structure 70 at any one time, this tack-welding process allows for controlled heating and cooling throughout the sandwich structure 70, which in turn allows for improved tack welds. Thus, portions of the sandwich structure 70 following tack-welding are allowed to cool while other portions are being tack-welded. This cooling process provides better tack-welds and the resulting sandwich structure 70 has a lower tendency to delaminate at individual tack welds. In other words, letting the structure 70 heat up and cool in different areas as it is being tack welded helps prevent individual tack welds from separating. After the metal core sandwich structure 70 has been tack welded together, as described above, the structure 70 is then placed in a furnace for brazing.

The metal core sandwich structure 70 may incorporate any type of metal and/or metal alloys as the formed core 10, 30 and the external metal sheets 60, such as A1 or D2 steel, for example. It is understood that any metals, metal alloys, or combinations thereof, that are suitable for brazing are contemplated to be within the scope of the present invention (e.g., copper, aluminum, titanium, etc.). Additionally, any type of known brazing material in the form of sheets, foils, sprays, powders, paste or slurries, for example, may be utilized in accordance with the present invention. Furthermore, it is contemplated that some embodiments of the invention may utilize non-metal core materials and non-metal external sheets. For example, known synthetic and/or polymer materials (e.g., Kevlar) may be used to form an injection-molded core and thereafter bonded (e.g., sonically welded and/or vibration welded) to synthetic and/or polymer outer sheets. Micro-abrasions are formed on the bonding lands of the non-metal core which facilitate gripping between the core and the external sheets during and after welding.

Further embodiments of metal core sandwich structures may include using a double cell sandwich core. These embodiments also have two external sheets defining a central core; but, instead of using a single core sheet (such as sheet 10 of FIG. 6), exemplary embodiments of double cell sandwich structures may use two core sheets.

Figure 8:
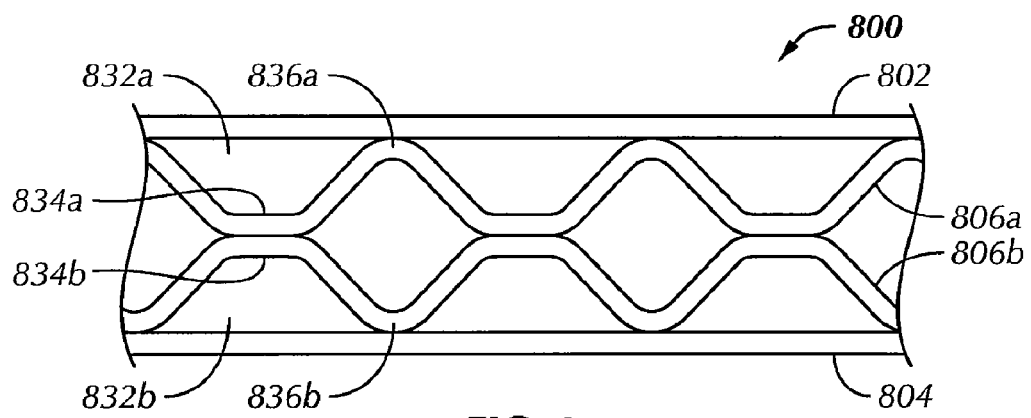
FIG. 8 illustrates a cross-sectional side view of one embodiment of a double cell sandwich structure.

One embodiment of a double cell sandwich structure 800 is shown in FIG. 8. Double cell sandwich structure 800 can comprise external sheets 802 and 804 sandwiching a first core sheet 806*a* and a second core sheet 806*b*. External sheets 802 and 804 may be the same as sheets 60 shown in FIG. 6. First core sheet 806*a* and second core sheet 806*b* may be made of the same materials as detailed above with reference to core sheet 10. In the embodiment 800, the first core sheet 806*a* and the second core sheet 806*b* comprise a plurality of pyramid-shaped cells 832*a*, 832*b*.

Further to FIG. 8, inwardly projecting lands 834*a* of the first sheet 806*a* contact corresponding inwardly projecting lands 834*b* of the second sheet 806*b*. In addition, outwardly extending lands 836*a* of the first sheet 806*a* contact an interior side of the external sheet 802 and outwardly extending lands 836*b* of the second sheet 806*b* contact an interior side the external sheet 804. The inwardly projecting landings 834*a* of the first sheet can be configured to be brazed or bonded with corresponding inwardly facing landings 834*b* of the second sheet. Moreover, outwardly facing landings 836*a* and 836*b* of the first sheet and the second sheet, respectively, can be configured to be brazed or bonded with the interior surface of corresponding external metal sheets 802 and 804. It is understood that any brazing or bonding technique described above may be similarly used with the lands 834 and 836 and external sheets 802 and 804 to facilitate gripping between the core sheets and the core sheets and external sheets. In one embodiment, micro-abrasions 18 are formed on a plurality of lands 834 and/or 836 to improve capillary action during the brazing process.

Figure 9:
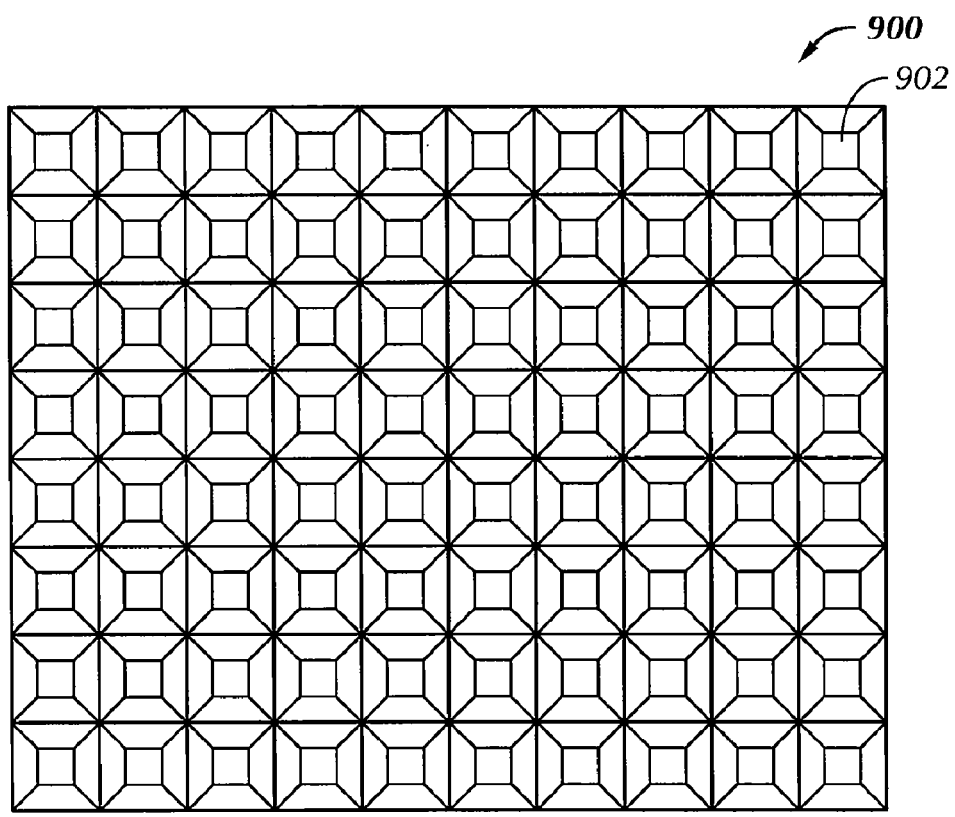
FIG. 9 illustrates a top view of a press plate used to form a core sheet used in the embodiment of FIG. 8.

FIG. 9 illustrates a top view of a press 900 configured to press or mold core sheets 806*a* and 806*b*, in accordance with one embodiment of the present invention. Press 900 has corresponding molded patterns, such as punch 902, and configurations to form the cores sheets 806*a* and 806*b*. During forming, a flat sheet of metal material can be placed between the top press 900 and a corresponding bottom press (not shown). As the top press 900 and the bottom press are pressed together, a core sheet is formed via stretching and/or gathering of the metal sheet. It is understood that press 900 is exemplary only and that presses having other desired molded patterns and configurations may be used to form metal core sheets having cells of various shapes, sizes and configurations.

Figure 10:
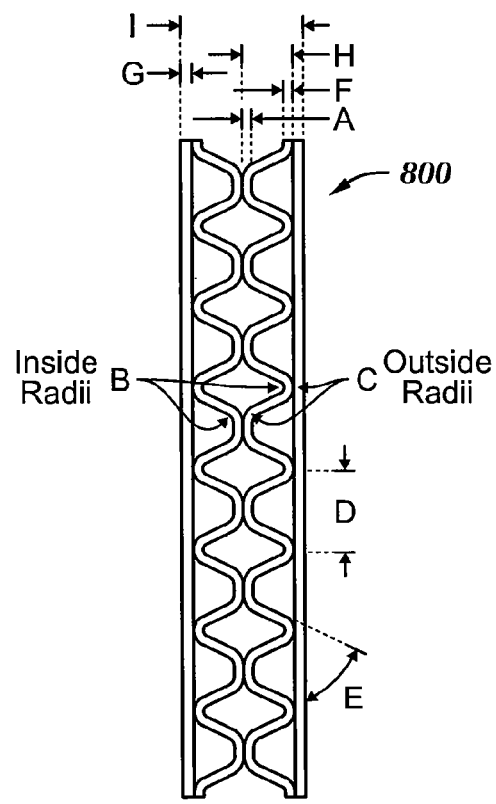
FIG. 10 is cross-sectional side of the embodiment of FIG. 8 showing exemplary dimension.

FIG. 10 is a cross-sectional view of structure 800 showing exemplary dimensions of the structure 800. The exemplary dimensions are as follows: an inwardly projecting landing thickness A=0.0040"; an inside radii B=0.0006"; an outside radii C=0.010"; a cell diameter D=0.050"; a cell incline E=70°; an outwardly projecting landing thickness F=0.0040"; an external sheet thickness G=0.0060"; a core sheets width H=0.0300"; and a sandwich cell structure width I=0.0720". It is understood that the above dimensions are exemplary only and that a sandwich core structure having other sizes and configurations may be used as desired to fit the needs of a particular application.

Figure 11:
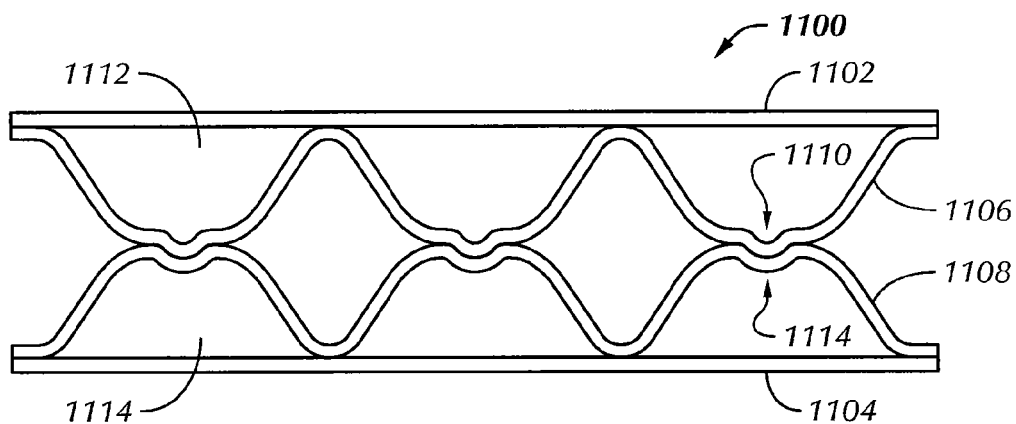
FIG. 11 illustrates a cross-sectional side view of a further embodiment of a double cell sandwich structure.

FIG. 11 is a cross-sectional side view of a further embodiment of a double cell sandwich structure 1100. Structure 1100 has external sheets 1102 and 1104 sandwiching first core sheet 1106 and second core sheet 1108. The first core sheet 1106 has a generally sinusoidal cross-sectional shape with a bulge 1110 located at a tip of each inwardly projecting peak 1112. The second core sheet 1108 also has a generally sinusoidal cross-sectional shape, but has a dimple 1114 located at a tip of each inwardly projecting peak 1116. As seen in FIG. 11, the bulges 1110 sit in the corresponding dimples 1114.

The bulges 1110 and dimples 1114, as well as the area near the bulges and dimples, may be brazed or bonded to facilitate gripping with a corresponding surface. Moreover, outwardly facing landings 1118*a* and 1118*b* of the first sheet 1106 and the second sheet 1108, respectively, can be configured to be brazed or bonded with the interior surface of corresponding external metal sheets 1104 and 1102. As is appreciated, any suitable brazing or bonding technique described in this disclosure may be used. In one embodiment, micro-abrasions 18 are formed on respective surfaces to improve capillary action during the brazing process.

Similar to embodiments described above, the first core sheet 1106 and the second core sheet 1108 may be formed between two presses having corresponding molded patterns and configurations to form a flat metal sheet into the desired shape and configuration.

Figure 12A:
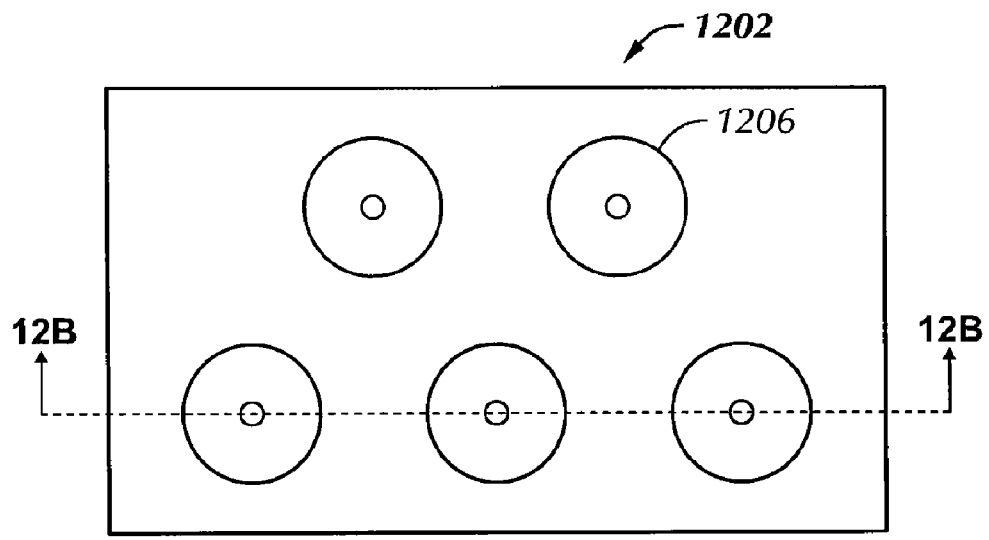
FIG. 12a illustrates a top view of an upper press used to form a first core sheet used in the embodiment shown in FIG. 11.

FIG. 12*a* is a top view of an upper press 1202 having a plurality of pins 1206 for forming the first core sheet 1106. In one embodiment, pins 1206 are spaced an equal distance away from each adjacent pin 1206. In a further embodiment, partial pins that would otherwise be located at edges of the press 1202 are eliminated. This is believed to help avoid sharp edges which could cut the material being formed. Only five pins 1206 are shown in FIG. 12*a* for ease of understanding for the reader. As is appreciated, there is no limit as to the number of pins 1206 that can be used.

Figure 12B:
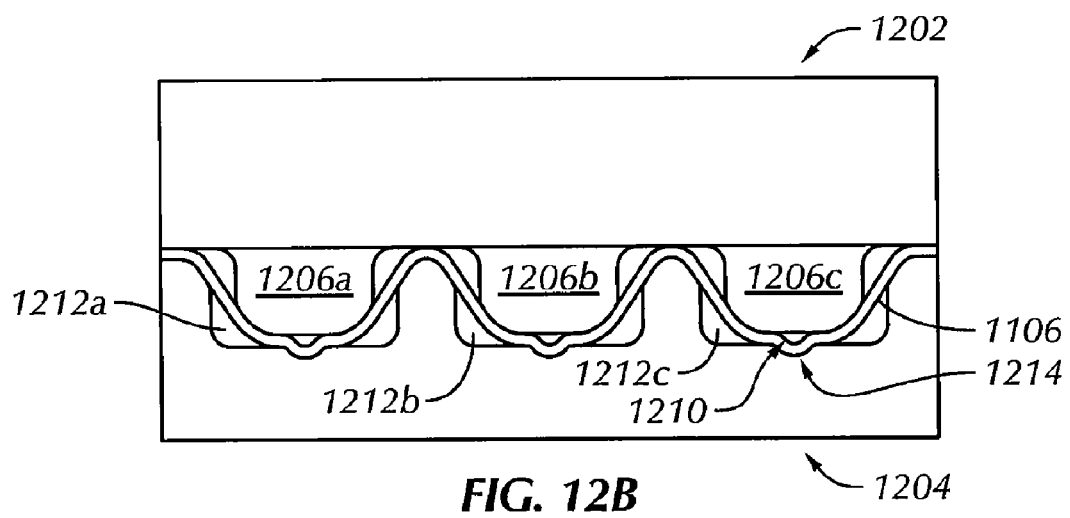
FIG. 12b is a cross-sectional side view of the upper press of FIG. 12 and a lower press used for forming a first core sheet, in accordance with one embodiment of the present invention.

FIG. 12*b* illustrates the cross-sectional side view of the upper press 1202, taken along the lines 12*b*-12*b* of FIG. 12*a*, and lower press 1204 forming the first core sheet 1106 in accordance with one embodiment of the present invention. As can be seen, pins 1206*a*, 1206*b*, 1206*c* have a generally conical shape and extend outwardly from a baseline 1208 of the upper press 1202. Located at a tip of each pin 1206*a*, 1206*b*, 1206*c* is a projection 1210. The lower press 1204 has a plurality of conically-shaped cavities 1212*a*, 1212*b*, 1212*c*, each cavity 1212 having an indentation 1214 located at a central bottom area of each cavity 1212. Pins 1206*a*, 1206*b*, 1206*c* extends into respective cavities 1212*a*, 1212*b*, 1212*c* when the upper press 1202 and lower press 1204 are pressed together to form the first core sheet 1106.

Figure 13A:
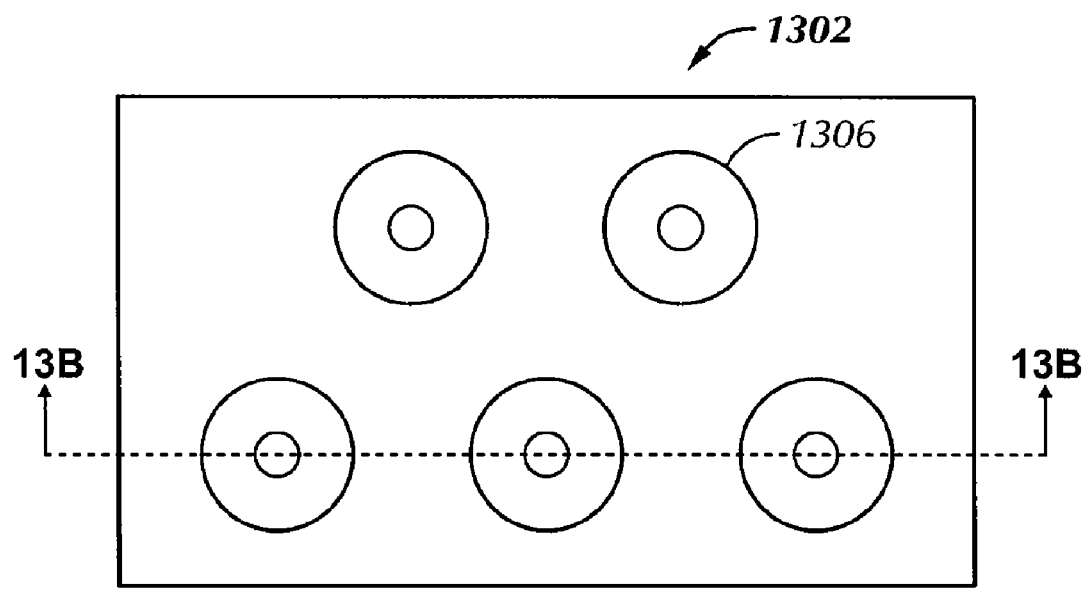
FIG. 13a illustrates top view a top view of an upper press used to form a second core sheet used in the embodiment shown in FIG. 11.

FIG. 13*a* is a top view of an upper press 1302 having a plurality of pins 1306 for forming the second core sheet 1108. As with the upper press 1202, pins 1306 may be spaced an equal distance away from each adjacent pin 1306 and partial pins that would otherwise be located at edges of the press may be eliminated. Eliminating partial pins on the edges of a press is believed to help avoid sharp edges which could cut the material being formed. Also, only five pins 1306 are shown in FIG. 13 for ease of understanding for the reader. As is appreciated, however, there is no limit as to the number of pins 1306 that can be used.

Figure 13B:
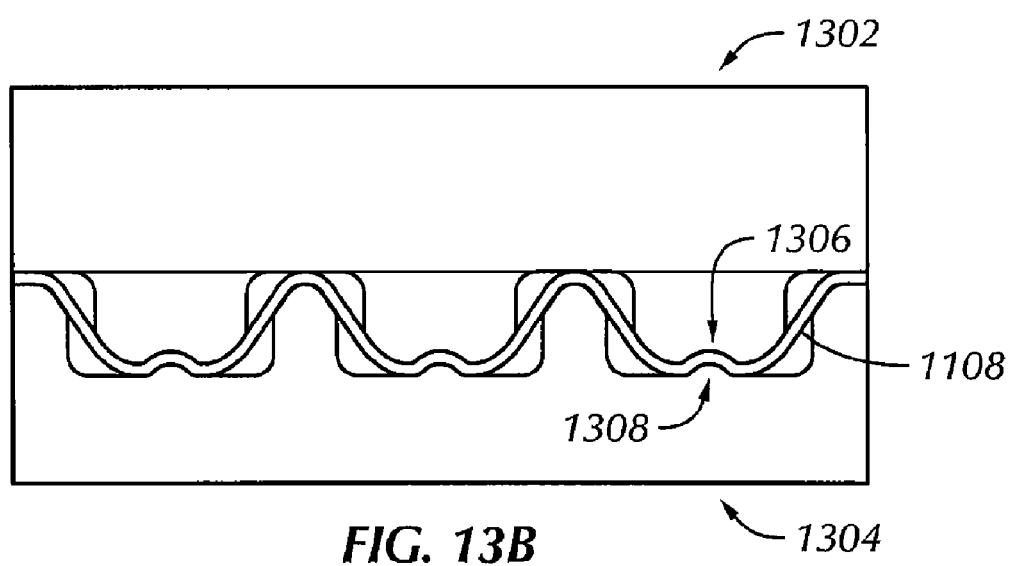
FIG. 13b is a cross-sectional side view of the upper press of FIG. 13a, taken along the lines 13b-13b of that figure, and a lower press for forming a second core sheet, in accordance with one embodiment of the present invention.

FIG. 13*b* illustrates a cross-sectional side view of upper press 1302, taken along the lines 13*b*-13*b* of FIG. 13*a*, and lower press 1304 forming a second core sheet 1108 in accordance with an embodiment of the present invention. The upper press 1302 and lower press 1304 can be similar to the upper press 1202 and lower press 1204, respectively, with an exception being that that the upper press 1302 has indentations 1306 instead of projections 1210 and the lower press 1304 has projections 1308 instead of indentations 1214. In other words, the placement on respective presses of the projections and indentations for forming the first core sheet 1106 is reversed for forming the second core sheet 1108. Also, the indentations 1306 and projections 1308 are preferably larger than the indentations 1214 and projections 1210 to permit the bulges 1110 formed in the first sheet 1106 to sit in the dimples 1114 formed in the second sheet 1108, as shown in FIG. 11.

Figure 14:
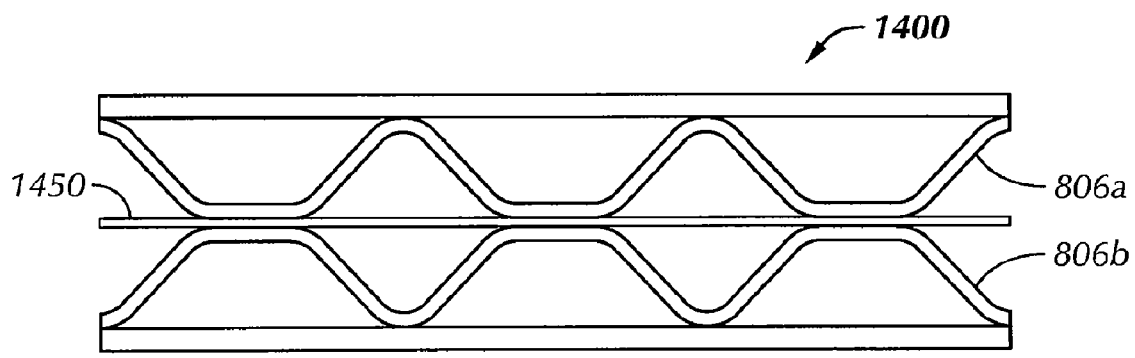
FIG. 14 illustrates a cross-sectional side view of an exemplary embodiment of a double cell sandwich structure having a middle sheet, in accordance with one embodiment of the present invention.

FIG. 14 illustrates a cross-sectional side view of a double cell sandwich structure 1600 having a middle sheet in accordance with another embodiment of the present invention. Some parts of the structure 1400 are identical to those of the previously described embodiments, and like reference numerals have been used for like parts as appropriate. As shown in FIG. 14, a middle sheet 1450 is positioned between the first core sheet 806a and the second core sheet 806b.

Figure 15:
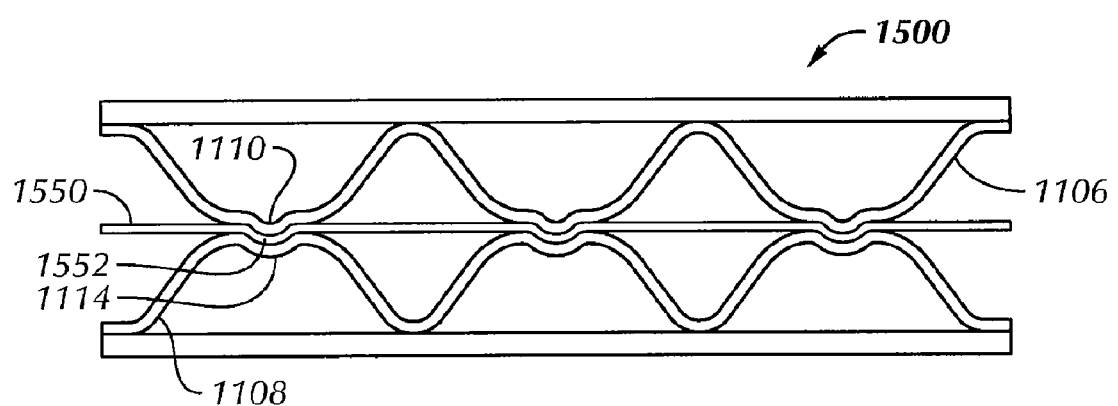
FIG. 15 illustrates a cross-sectional side view of another exemplary embodiment of a double cell sandwich structure having a middle sheet, in accordance with one embodiment of the present invention.

FIG. 15 illustrates a cross-sectional side view of a further embodiment of a double cell sandwich structure 1500 having a middle sheet, in accordance with another embodiment of the present invention. Some parts of the structure 1500 are identical to those of the previously described embodiments, and like reference numerals have been used for like parts as appropriate. As shown in FIG. 15, a dimpled middle sheet 1550 is positioned between the first core sheet 1106 and the second core sheet 1108. The dimpled middle sheet 1550 has dimples 1552 formed at locations corresponding to the locations of the bulges 1110 of the first core sheet 1106 and the dimples 1114 of the second core sheet 1108.

It is understood that sheets forming the respective structures 1400 and 1500 may be bonded or brazed together to facilitate gripping using the bonding or brazing techniques described in this disclosure.

The double cell sandwich structures provide many advantages. For example, it is believed that embodiments of double cell sandwich structures provide many of the advantages of the single cell structures; yet double cell structures can provide even more strength and further reduce dimpling and wrinkling on the surface of the structure during and after forming of the sandwich structure. Embodiments using of a middle sheet between the core sheets can strengthen the structure even further.

Various exemplary embodiments of the invention have been described above. However, it is understood that these various embodiments are exemplary only and should not limit the scope of the invention as recited in the claims below. Various modifications of the exemplary embodiments described above can be implemented by those of ordinary skill in the art, without undue experimentation. For example, although the invention has been described in the context of metal sandwich structures, it would be apparent to one of ordinary skill in the art that the invention can be applied to structures comprising different types of materials such as alloys, plastics, ceramics, etc. These various modifications are contemplated to be within the spirit and scope of the invention as set forth in the claims below.

What is claimed is:

1. A method of manufacturing a core sandwich structure, comprising:
    forming a non-honeycomb core having a first core and a second core each having a plurality of inwardly and outwardly projecting bonding lands and at least two non-parallel directions of corrugation, the first and second cores each being a continuous sheet of material;
    forming a bulge on at least a portion of the inwardly projecting bonding lands of the first core and forming a dimple on at least a portion of the inwardly projecting bonding lands of the second core, wherein the bulges are configured to be received at least partially within corresponding dimples when the first and second cores contact each other;
    placing the inwardly projecting bonding lands of the first core in contact with the inwardly projecting bonding lands of the second core;
    positioning at least a portion of the bulges in corresponding dimples, wherein each of a dimple extends inwardly relative to its bonding land and each of a bulge protudes outwardly relative to its bonding land; and
    securing first and second sheets to the first and second cores to form the core sandwich structure wherein the first and second cores are continuous sheets in the core sandwich structure.

2. The method of claim 1, further comprising:
    placing the first sheet in contact with the outwardly projecting bonding lands of the first core and placing the second sheet in contact with the outwardly projecting bonding lands of the second core, thereby forming a sandwich structure; and
    heating the sandwich structure to bond the first core, the first sheet, the second core and the second sheet together.

3. The method of claim 2, further comprising forming micro-abrasions on the outwardly projecting bonding lands of the first and second cores to provide improved capillary action during bonding with the first and second sheets.

4. The method of claim 2, further comprising:
    tack welding the first core to the second core and the first sheet; and
    tack welding the second core to the second sheet.

5. The method of claim 3, wherein the micro-abrasions comprise grooves approximately 0.0005 to 0.002 inches in depth.

6. The method of claim 3, wherein the micro-abrasions cover approximately 50-80% of the surface area of the bonding lands.

7. The method of claim 3, wherein the micro-abrasions are formed on the bonding lands during the forming of the first core and second core.

8. The method of claim 3, wherein the micro-abrasions comprise at least one of the group consisting of substantially parallel channels, criss-cross configurations, channels traveling in random directions, and curved channels.

9. The method of claim 3, wherein the micro-abrasions are formed by electronic discharge machining (EDM).

10. The method of claim 3, wherein a press is used to form the micro-abrasions.

11. The method of claim 10, wherein the micro-abrasions are formed on the bonding lands of each core after the core has been pressed and formed.

12. The method of claim 10, further comprising providing presses with preformed micro-protrusions that automatically form micro-abrasions on each core during pressing.

13. The method of claim 2, further comprising providing a bonding material between the inwardly projecting bonding lands of the first core and the inwardly projecting bonding lands of the second core, wherein the micro-abrasions improve capillary action during bonding of the first core to the second core.

14. The method of claim 1, wherein the first core and the second core comprise a plurality of cells, each of the cells having a pyramid-like shape.

15. The method of claim 1, further comprising:
forming a plurality of micro-abrasions on the plurality of inwardly projecting bonding lands of the first core and of the second core, wherein the micro-abrasions allow for improved capillary action at the bonding lands.

16. A method of manufacturing a core sandwich structure, comprising:
forming a non-honeycomb core having a first and a second core each having a plurality of inwardly and outwardly projecting bonding lands and at least two non-parallel directions of corrugation, wherein a plurality of the inwardly projecting bonding lands of the first core are bonded to a plurality of the inwardly projecting bonding lands of the second core, the first and second cores each being a continuous sheet of material; and
forming a bulge on at least a portion of the inwardly projecting bonding lands of the first core and a dimple on at least a portion of the inwardly projecting bonding lands of the second core, positioning bulges at least partially within corresponding dimples, wherein each dimple extends inwardly relative to its bonding land and each bulge protudes outwardly relative to its bonding land; and
securing first and second sheets to the first and second cores to form the core sandwich structure wherein the first and second cores are continuous sheets in the core sandwich structure.

17. The method of claim 16, wherein the bulges formed on the inwardly projecting bonding lands of the first core sit in the dimples formed on the inwardly projecting bonding lands of the second core.

18. The method of claim 16, wherein a dimpled middle sheet is positioned between the first core and the second core.

19. The method of claim 18, wherein the dimpled middle sheet has dimples formed at locations corresponding to locations of the bulges formed in the first core and the dimples formed in the second core.

20. The method of claim 16, wherein the bulges, dimples, and an area around the bulges and the dimples, are bonded to facilitate gripping.

21. The method of claim 16, wherein the first core is tack welded to the second core and the first sheet, and the second core are tack welded to the second sheet.

22. The method of claim 16, wherein the first and second cores each have a generally sinusoidal cross-sectional shape, having a plurality of inwardly projecting peaks.

23. The method of claim 22, wherein the dimples are located at a tip of the corresponding inwardly projecting peaks, and wherein the bulges sit in the corresponding dimples.

24. The method of claim 16, further comprising forming a plurality of micro-abrasions on the plurality of bonding lands prior to bonding, so as to allow for improved capillary action at the bonding lands during bonding.

25. A method of manufacturing a multi-layer sandwich structure, comprising:
forming a non-honeycomb core having a first core structure and a second core structure each having a plurality of inwardly and outwardly projecting bonding lands and at least two non-parallel directions of corrugation, the first and second cores each being a continuous sheet of material;
forming, prior to bonding, a bulge on at least a portion of the inwardly projecting lands of the first core structure and a dimple on at least a portion of the inwardly projecting lands of the second core structure, wherein bulges are received at least partially within corresponding dimples, wherein each of a dimple extends inwardly relative to its bonding land and each of a bulge protrudes outwardly relative to its bonding land;
bonding the plurality of the inwardly projecting lands of the first core structure to the plurality of the inwardly projecting lands of the second core structure;
securing first and second sheets to the first and second cores to form the multi-layer sandwich structure wherein the first and second cores are continuous sheets in the multi-layer sandwich structure.

26. The method of claim 25, wherein a middle sheet is positioned between and bonded to the first core structure and the second core structure.

27. The method of claim 25, further comprising providing, prior to bonding, a middle sheet positioned between the first core structure and the second core structure, wherein the middle sheet has dimples formed at locations corresponding to the bulges formed in the first core structure and to the dimples formed in the second core structure.

28. The method of claim 27, wherein the bulges formed in the first core structure sit in the dimples formed in the second core structure.

29. The method of claim 25, wherein the dimples are located at a tip of corresponding inwardly projecting peaks, and wherein the bulges sit in the corresponding dimples.

30. The method of claim 25, wherein the bulges, the dimples, and an area around the bulges and the dimples, are bonded to facilitate gripping.

31. The method of claim 25, wherein the first core structure and the second core structure each have a generally sinusoidal cross-sectional shape.

* * * * *